US006697943B1

(12) United States Patent
Frantz

(10) Patent No.: US 6,697,943 B1
(45) Date of Patent: Feb. 24, 2004

(54) USE OF CYCLIC REDUNDANCY CHECKING FOR SEGREGATING CONTROL TRAFFIC

(75) Inventor: Paul J. Frantz, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/466,360

(22) Filed: Dec. 17, 1999

(51) Int. Cl.$^7$ .................................................. G06F 1/24
(52) U.S. Cl. ....................... 713/160; 713/161; 713/164; 713/168
(58) Field of Search ................. 713/160, 161, 713/164, 168

(56) References Cited

U.S. PATENT DOCUMENTS 5,668,803 A * 9/1997 Tymes et al. ............... 370/312
5,671,283 A * 9/1997 Michener et al. ........... 713/161

* cited by examiner

Primary Examiner—Thomas R. Peeso
(74) Attorney, Agent, or Firm—Campbell Stephenson Ascolese, LLP

(57) ABSTRACT

A method of modifying the error detection code (EDC) generation and verification logic at both ends of a communications link in a data communications device or system so that user packets and control packets use different EDC algorithms to protect the communications device from control packet spoofing and interference by randomly-generated test data. Data packets are transmitted internally with a standard cyclic redundancy check (CRC) or other error detection coding scheme while control packets are given a different "control" EDC. At the receiving end of the link, the received packet is tested to determine whether the EDC matches the standard or control forms. If the EDC complies with neither of these two requirements, then the packet is discarded. If, however, the packet matches the control EDC but not the standard EDC, it is checked to see if the header is in the expected control format. If the control EDC is present but the header is incorrect, the packet is discarded. Otherwise, the packet is a proper control packet having a control header and is processed according to the usual means employed in such communications device. If the EDC matches the standard data EDC form, the packet is again checked for a control header. If a control header is present, a spoof control packet has been received. The system then sets the appropriate alerts and discards the packet. Otherwise, the packet is a standard data packet having a standard header and is ready for further processing.

28 Claims, 7 Drawing Sheets

USE OF CYCLIC REDUNDANCY CHECKING FOR SEGREGATING CONTROL TRAFFIC

BACKGROUND OF THE INVENTION

1. Field of the Invention

The present invention generally concerns communications security between network communications devices, in particular security implemented through packet-or frame-level encoding.

2. Description of the Related Art

In packet switch architectures commonly employed today there is, generally speaking, a central core or processor which switches multiple data streams operating at speeds of many millions or billions of bits per second. There are also peripheral devices which work on those streams as input interfaces, output interfaces, and/or subprocessors. The link between the central core and the peripherals is often implemented by using standard communications protocols such as Ethernet and/or Internet Protocol (IP) with standard packet formats. As the peripherals are slave devices to the core, there is a need for control packets to be sent between the core and the peripherals. These packets control such functions as enabling or disabling peripheral ports and gathering statistics from the ports. The use of such master/slave communications systems is well-known in the art.

There are two approaches commonly in use for carrying control packets between a core and its peripherals. One approach, referred to as out-of-band signaling, provides physical separation of the communication channels for control vs. user data packets. That separation can be provided by various means, such as physically separate wires, different carrier frequencies in a radio system, different wavelengths in a fiber system, etc. The common element of these systems is that separation of control vs. user data traffic does not rely on the contents of the packets or frames themselves.

The alternative approach is commonly referred to as in-band signaling. In the in-band approach, both user data and control frames are carried over the same communication channel. An Ethernet link between the core and a peripheral, as one in-band example, carries both user data packets and control packets. Correct operation of the system requires that both the core and the peripherals are reliably able to distinguish control packets from user data packets.

The current methodology of communicating between core and peripherals renders the system open to denial of service attacks by malicious users who "spoof" the control packets. Such spoofing takes the form of maliciously introducing packets configured as control packets into the network in an attempt to seize control or "own" the switch or communications device or simply to disrupt its operations. Current systems are also susceptible to the incorrect categorization of user data packets as control packets when, for example, standard test equipment (such as the Netcom Systems, Inc. SMARTBITS™ tester) is configured to run test packets filled with random data through the switch. These random data packets can, probabilistically, assume a format that may match that of a control packet, thereby causing current network communications devices to misinterpret the random data packet as a control packet with deleterious affects. (SMARTBITS is a trademark of Netcom Systems, Inc. of Calabasas, Calif.)

Communications protocols other than Ethernet and IP are of course also possible. For example, asynchronous transfer mode (ATM) frames may be used to communicate between elements of a distributed switching or routing system. Accordingly, the present problem is not limited to packet-oriented data; the terms "packet" and "frame" may be used interchangeably in the context of the present disclosure. One of ordinary skill in the art will readily appreciate that any data packetization or framing scheme will face the same problems.

What is needed is a system whereby control and data packets or frames are reliably and rapidly distinguishable from one another in transit and on receipt in a communications device. Furthermore, such a system must be robust and resistant to spoofing by outside users as well as resistant to packet mis-identification when configured for testing.

SUMMARY

The present invention is a method and apparatus for modifying the error detection code (EDC) generation and verification logic at both ends of the core/peripheral communications link so that data packets and control packets use different algorithms. In particular, data packets are configured to use a standard cyclic redundancy check (CRC) or other EDC scheme while control packets use a special "control" CRC/EDC. Device elements at both ends of the communications link use methods well-known in the art to decide whether a packet is supposed to be a control packet or a data packet. However, if a packet is determined to be a control packet, it is sent over the link with a special CRC encoding. At the receiving end of the link (in, for example, a peripheral unit within a communications system or device), a test is run on the received packet to determine whether the CRC matches the standard form or, if not, whether the CRC complies with the special control CRC algorithm. If the CRC complies with neither of these two requirements, it is flagged as a bad packet and discarded by means well known in the art. If, however, the packet does not comply with the standard CRC form but does match the control CRC, the packet is checked to see if the header is in the expected control header format, again by means well-known in the art. The packet is forwarded for further processing only if it is in the correct form. If, however, the control CRC is present but the header is incorrectly formatted, the packet is discarded. In either situation, the standard notification method for the receipt of bad packets is initiated.

In the case where the CRC matches the standard data packet CRC form, the packet is checked to see if a control header is present. In this case, i.e., if a control header is found with the standard CRC, the system concludes that a spoof control packet has been received. The system sets the appropriate alerts though means well known in the art and discards the packet. If, however, the control header is not present, then the packet is a standard packet having a standard header, i.e., a data packet. The data packet is passed onward for further processing according to the usual means employed in such communications devices.

The present invention and its various embodiments thus provide a fast and efficient security system for protecting a communications device from control packet spoofing and/or interference from randomly-generated test data. This invention provides a robust means of segregating user data from control traffic in systems using in-band signaling. The system is readily adaptable for a wide variety of data communications applications, especially including but not limited to packet routing and switching, data networking, and virtual private circuit networking.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
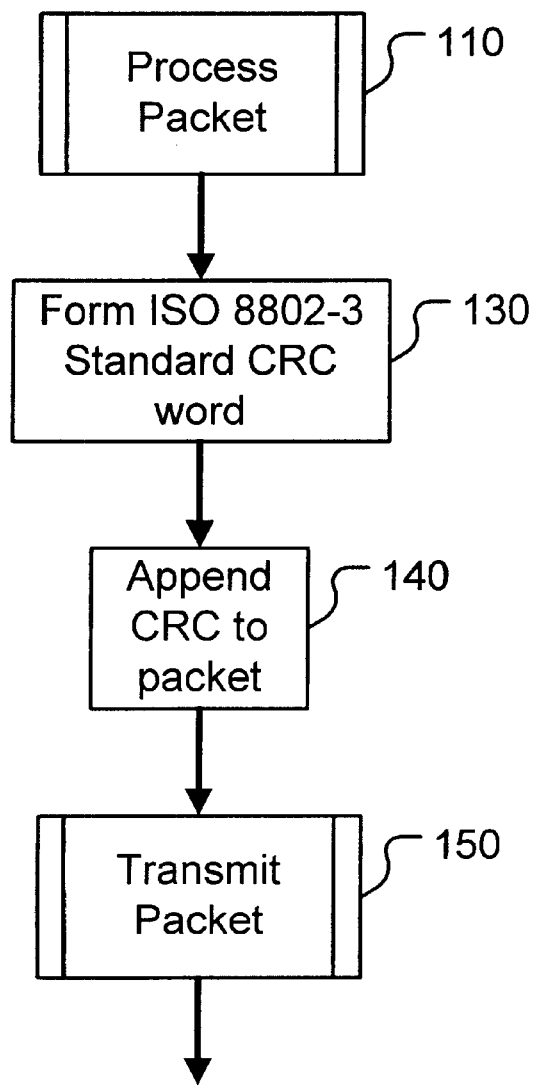
FIG. 1 is a high level flow diagram of the prior art method for generating and appending a CRC in the transmit direction.

FIG. 1 illustrates the method of applying error detection codes (EDC) to packet communications currently known in the art. The packet is processed 110 by a communications device (such as a switch or router core or peripheral unit) at the transmitting or sending end of the communications link to be secured. Processing 110 consists of any of the various packet-handling methods known in the art, including but not limited to determining a routing or switching destination.

The packet is read to determine certain well-defined characteristics of the packet itself, themselves well-known in the art, and a cyclic redundancy check (CRC) error detection code is formed 130 according the International Organization for Standardization (ISO)/International Electrotechnical Commission (IEC) Standard 8802-3 (also known as the American National Standards Institute [ANSI]/Institute of Electrical and Electronics Engineers [IEEE] Standard 802.3) by means well-known in the art. ISO/IEC Std. 8802-3 (ANSI/IEEE Std. 802.3) is hereby incorporated by reference in its entirety. Other EDC codings are also known and used in the art; FIG. 1 is thus only one example of prior art EDC methods.

The CRC code is appended to the packet 140 and the packet is transmitted 150 across the communications link or network. Both append 140 and transmit 150 are accomplished through means well-known in the art.

Figure 2:
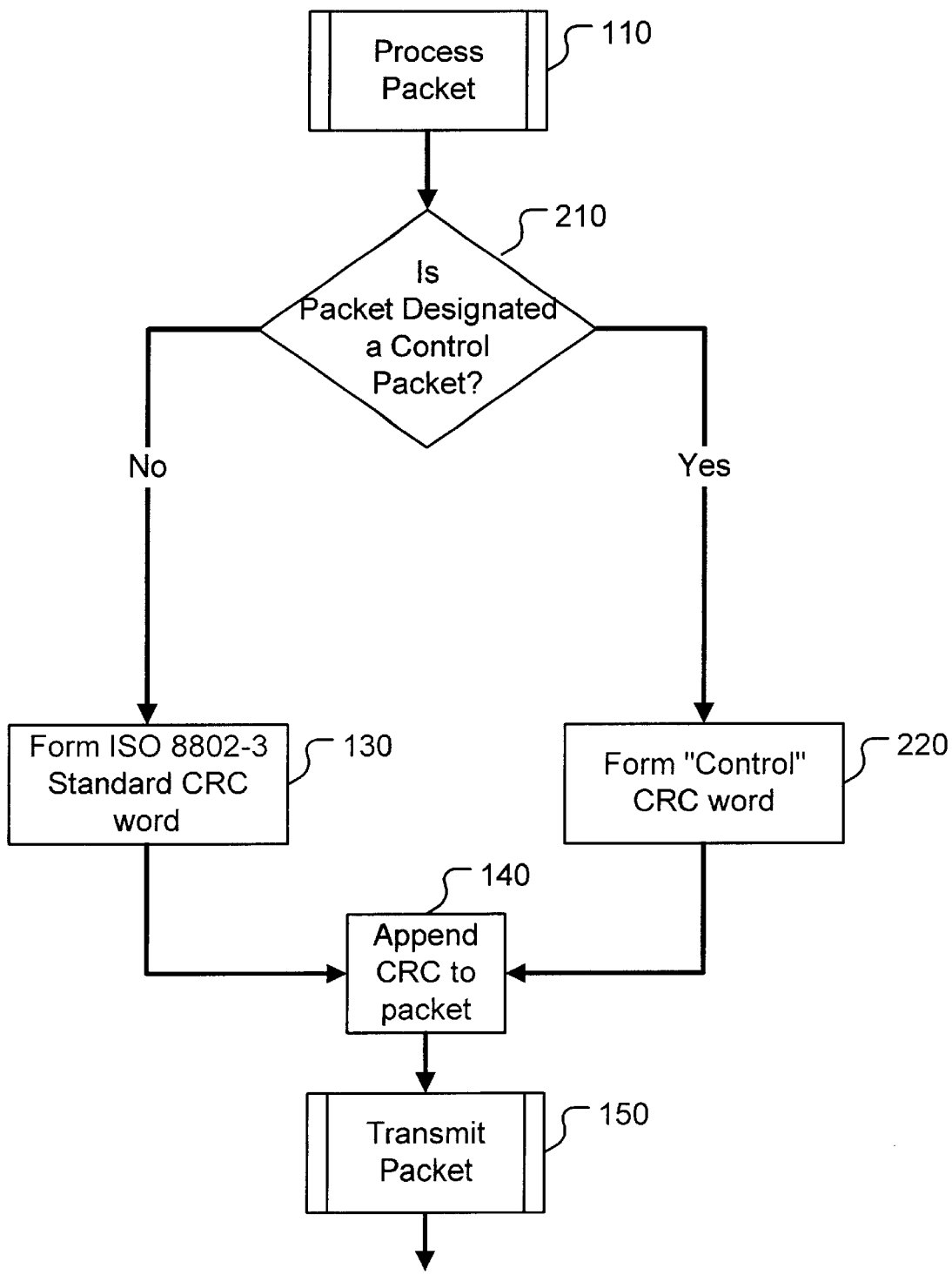
FIG. 2 is a high level flow diagram of the secure CRC formation procedure in the transmit direction, according to one embodiment of the present invention.

The process of the present invention is illustrated in FIG. 2. As in the prior art, the packet to be transmitted is processed 110 by means well-known in the art. The packet is then tested 210 to determine if it is designated a control packet. Such designation may be accomplished by a number of means well-known in the art, including but not limited to setting bits, bytes, or words in the packet header to a pre-defined configuration or setting IP packet header options. In one embodiment, a classifier circuit is used to read pre-determined fields within the packet header to decide if the packet is designated a control packet.

If the packet is not a control packet, a pre-defined portion of the packet's contents is read and used to form 130 a standard data packet EDC (referred to as the "first" EDC in the Claims). In one embodiment of the present invention, the standard data packet EDC is an ISO 8802-3 CRC word. The first EDC word is then appended 140 to the packet and the packet is transmitted 150 across the communications link by means well-known in the art.

Although appending the EDC is described, those skilled in the art will realize that other methods of associating the EDC with the packet to be transmitted, such as but not limited to prepending or insertion within the packet, can be used. Accordingly, the invention is not limited to any particular type of association.

If the packet is found to be a control packet, a pre-defined portion of the packet's contents is read and used to form 220 a special control EDC word (the "second" EDC). In one embodiment of the present invention, the control EDC word is a variation on the standard ISO 8802-3 CRC, such as but not limited to an XOR function with the result of the standard ISO 8802-3 CRC generation algorithm. The control EDC word is then appended 140 to the packet and the packet is transmitted 150 across the communications link by means well-known in the art.

Figure 4:
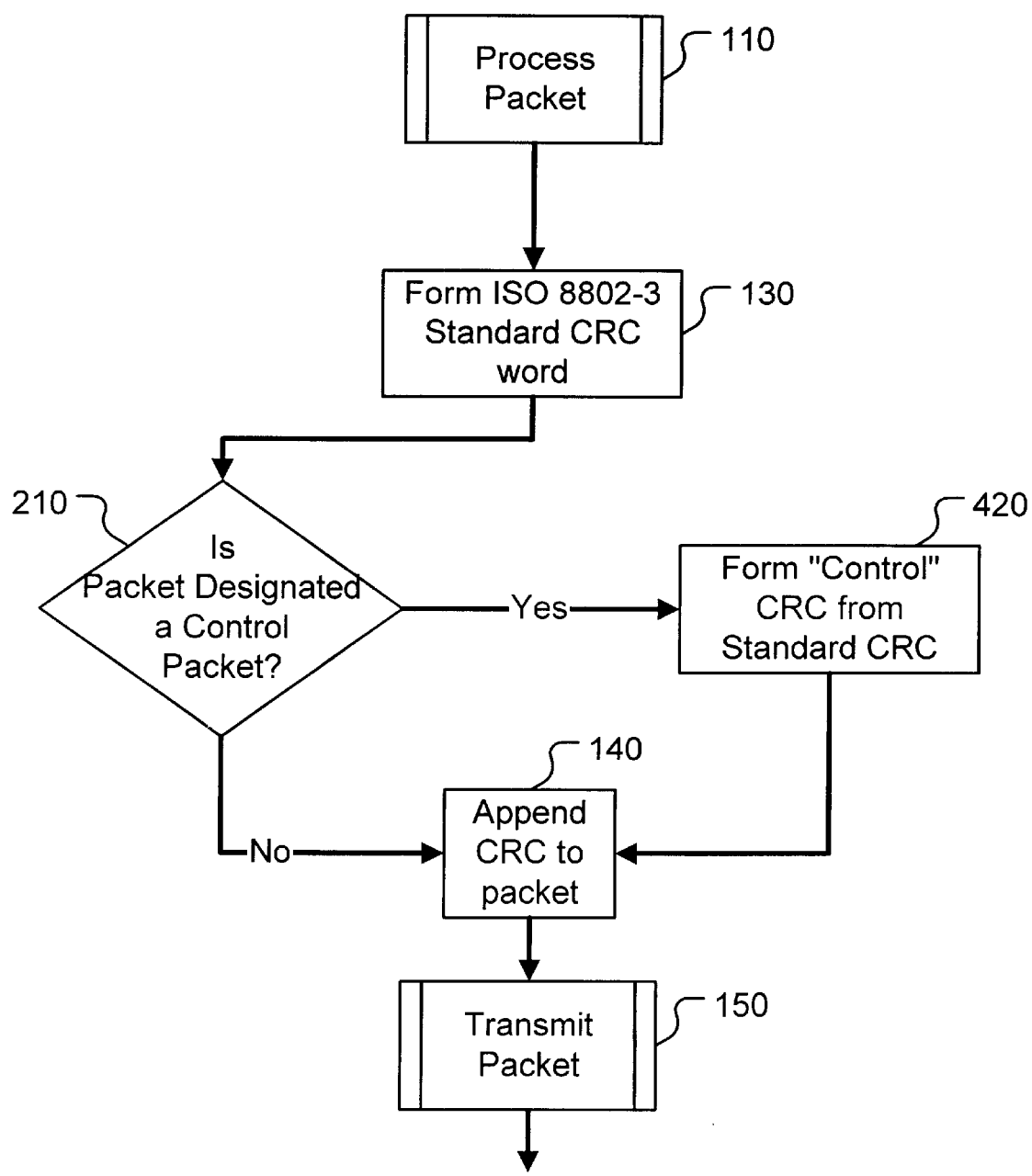
FIG. 4 is a high level flow diagram of the transmit process for implementing secure CRC validation, according to an alternate embodiment of the present invention.

In another embodiment, the control EDC word is a function of the standard EDC word, as shown in FIG. 4. ISO 8802-3 standard CRC word is formed 130 in all cases, before the packet header is tested 210 to determine if the packet is a control packet. If a control packet header is present, the control EDC (in this case a CRC) is formed as a function of the standard CRC, step 420. Such a function may include an XOR of a fixed bit pattern with the ISO 8802-3 CRC word.

Although a CRC error detecting code is described, those skilled in the art will realize that error detecting codes other than a CRC code can be used. Accordingly, the invention is not limited to any particular type of EDC. Furthermore, persons of ordinary skill in the art will appreciate that the terms EDC and CRC may be used interchangeably in this context and that the use of one term does not preclude the use of the other.

Figure 3:
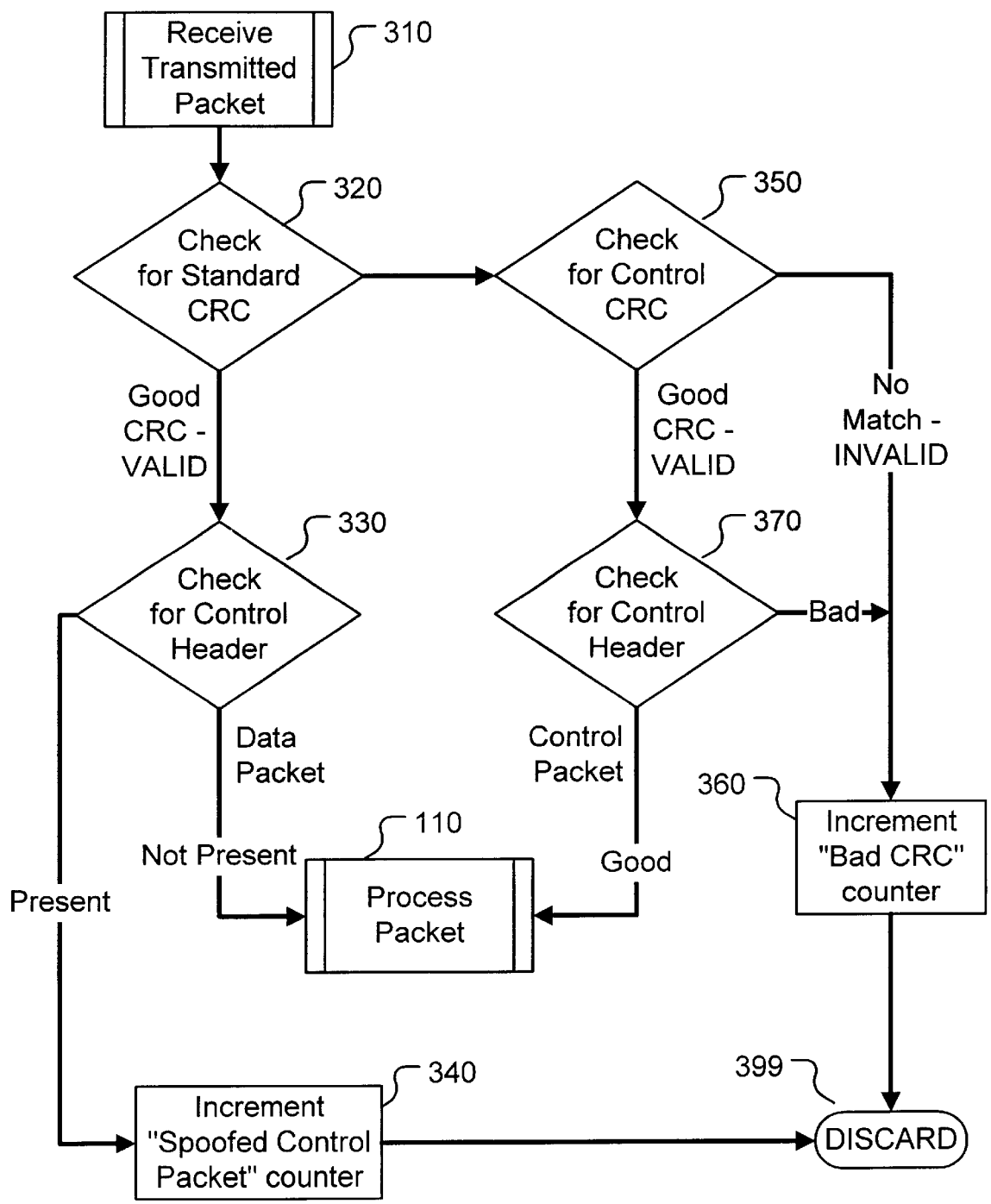
FIG. 3 is a high level flow diagram of the receive process for implementing secure CRC validation, according to one embodiment of the present invention.

On the receiving end of the communications link, the packet undergoes a two-stage checking process shown in FIG. 3. The packet is received 310 by standard means well-known in the art and the received EDC word is checked 320. This check consists of reading the packet, computing (generating) a standard ("third") EDC, and comparing the computed EDC to the received EDC. If the received and computed values match, the check output is placed in a "VALID" state. Otherwise, the check output is placed in the "INVALID" state. In the case where the EDC is a standard ISO 8802-3 CRC, the computation and checking (also known as validation of the EDC) is performed by means well-known and commonly employed in the art.

Although the above method of validating an EDC is described, those skilled in the art will realize that other methods besides the aforementioned can be used. For example, for some EDCs there is a more efficient way to validate the EDC than to recompute it and compare it against the received EDC: it is common to compute a checksum over the received frame up to and including the received checksum field, and then check to make sure the resulting checksum is zero. Accordingly, the invention is not limited to any particular validation method and subsequent sections of this disclosure will be properly read to include such alternate but well-known methods.

In embodiments computing the control EDC as a function of the standard EDC, as described with regard to FIG. 4 above, control CRC check 350 does not involve generating an entire new CRC. Rather, the (third) CRC locally generated in step 320 is modified with the same XOR function.

That result is then checked against the received value. Equivalently, one can also modify the received value with the (same) XOR function and compare that result to the (third) CRC locally computed in step 320.

If the received EDC, which in the embodiment shown in FIG. 3 is a CRC code, matches the computed EDC ("Good CRC—VALID"), the packet header is checked 330 for the presence of the pre-defined distinguishing characteristics of a control header. If the packet is not a control packet, it is processed normally 110 in the communications device. However, if the packet header indicates that it is a control packet in check 330, then the system concludes it is being spoofed (attacked). This conclusion results from the fact that a packet having a standard EDC and a control header was received, a situation rendered impossible by the method implemented on the transmitting end of the link shown in FIG. 2. In one embodiment of the present invention, a "Spoofed Control Packet" counter is incremented 340 and the packet is discarded 399. Persons of ordinary skill in the art will of course realize that other actions could be taken on identification of a spoofed packet, including but not limited to setting an alarm or alert, generating a message, or simply dropping the packet without any further action.

If, however, the EDC does not match the computed standard EDC in check 320 ("No Match—INVALID"), a second check 350 is performed to see if the control EDC word is present. In the embodiment shown in FIG. 3, the control EDC consists of a modified CRC, although persons of ordinary skill in the art will appreciate that other EDC forms are possible. As in check 320, check 350 is performed by means well known in the art and comprises the sub-steps of reading the packet, computing a control EDC (the "fourth" EDC) according to the same algorithm used in step 220 (FIG. 2), and verifying the received EDC against the computed EDC. If the received and computed values match, the check results in a "VALID" output ("Good CRC"). Otherwise, the output is placed in the "INVALID" state.

In some embodiments of the present invention, the control EDC (against which the received EDC is compared in check 350) is generated by an operation, such as an XOR function using a fixed data pattern, on the standard (third) EDC used in check 320 rather than calculating it from scratch.

If check 350 results in a VALID output ("Good CRC"), the packet header is checked 370 for the presence of the pre-defined distinguishing characteristics of a control header. If the packet is a control packet (as expected), it is processed normally 110 in the communications device. However, if the packet header indicates that it is not a control packet, the system concludes a corrupted or bad packet has been received. In one embodiment of the present invention, a "Bad CRC" counter is incremented 360 and the packet is discarded 399. Persons of ordinary skill in the art will of course realize that other actions could be taken here, including but not limited to setting an alarm or alert, generating a message, or simply discarding the packet without any further action.

The above process thus secures a communications link between one or more cooperating elements of a packet communications system, such as the core and peripherals within a distributed router or switch.

Likewise, the system can be used to secure a communications link over a wider area, such as between two routers in an intranet or a local-, metropolitan-, or wide-area network, within certain limitations. For Ethernet networks using EDC modification, the invention works between adjacent network devices (e.g., a switch or a router) because they are the devices generating and checking EDCs. It will not work between two non-adjacent devices, such as two routers which have ordinary switches in between, because those ordinary switches will discard all the control frames, seeing them as "Bad CRC" packets. If the two routers are adjacent at layer 3 (with nothing but layer 2 switches in between them) one could use the invention by modifying the EDC at a higher layer (e.g., the UDP checksum). Generally, the invention is applicable between any two devices which are "adjacent" as far as EDC generation and checking is concerned.

Persons of ordinary skill in the art will also appreciate that the above-described method can also be implemented in a hardware apparatus such as, but not limited to, a dedicated communications system specifically adapted for packet communications or a computer system comprising computer instructions for performing some or all of the steps of the present invention. Accordingly, the present invention is not limited solely to the above described embodiments, but rather encompasses any apparatus carrying out the present method as well as all computer systems, computer-readable storage media, and computer data signals embodied in carrier waves comprising computer instructions for carrying out the presently disclosed method.

Figure 7:
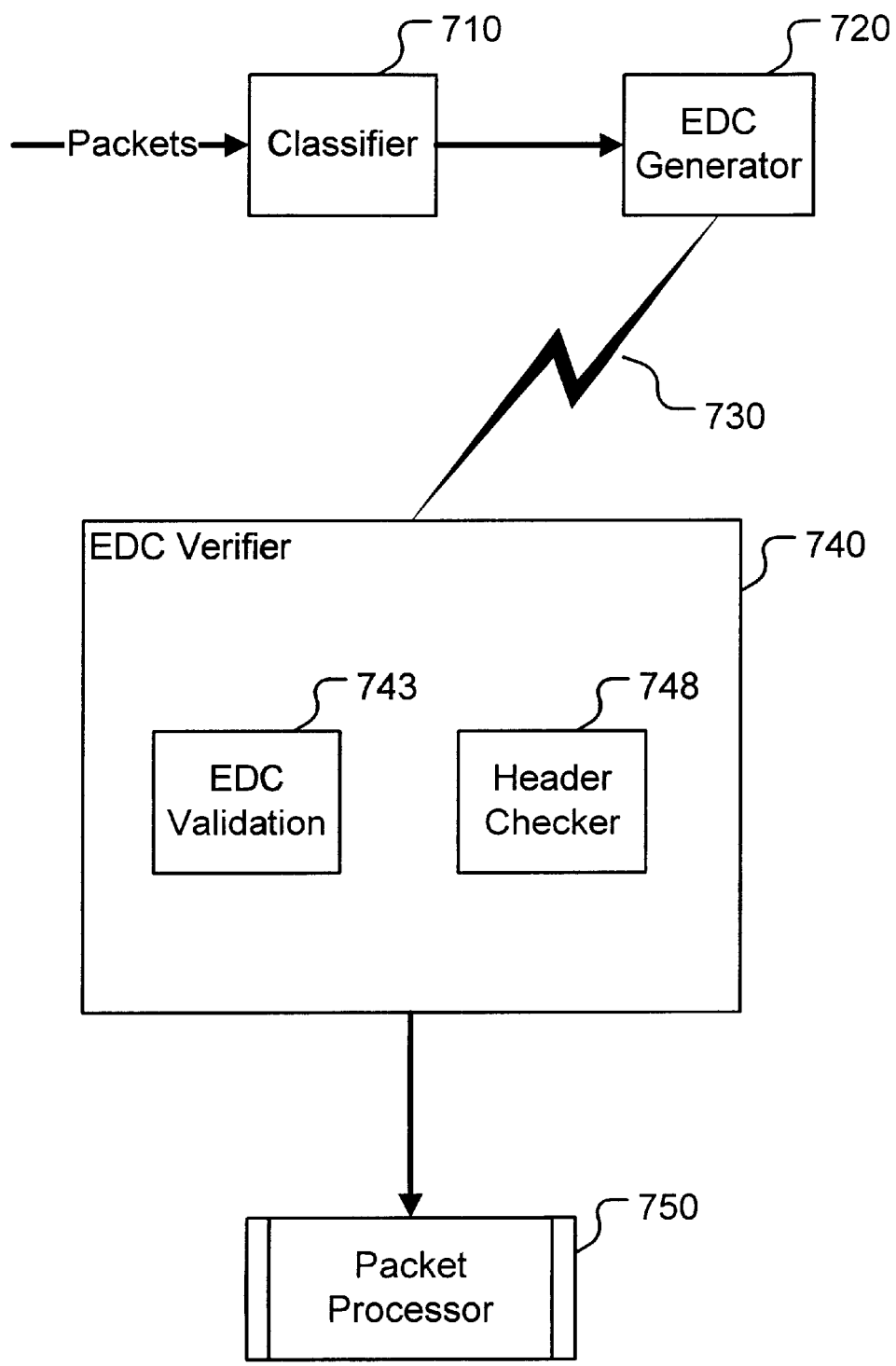
FIG. 7 is a high level block diagram of an apparatus according to one embodiment of the present invention.

One example of such an apparatus is shown in FIG. 7. Classifier circuit 710 receives packets through any of a number of means well-known in the art. Classifier 710 then determines whether the received packet has a control or data header by reading the appropriate fields from the header and outputting a signal accordingly. EDC generator 720, using the classification result of classifier 710, then computes the appropriate EDC for the packet type and contents (using any of the EDC computation methods noted above, such as CRC). The EDC computations are themselves well-known in the art.

The packet traverses the network via link 730. Link 730 represents the physical media and protocols necessary to connect the transmitting end of link 730 to the receiving end. Such media and protocols are themselves well-known in the data communication arts.

The transmitted packet is received at EDC verifier 740, which both verifies the received EDC against a calculated EDC and checks the header of the received packet. EDC verifier 740 contains validation circuits 743 (themselves well-known in the data communications arts) to verify the received EDC attached to a packet against one or more locally-computed (i.e., calculated within EDC verifier 740) EDCs. One or more validation circuits 743 may be present in EDC verifier 740, depending on the EDC calculation/verification method selected from the various embodiments disclosed herein.

EDC verifier 740 also contains header checker circuits 748 adapted to determine whether a received header is a control or a data header. These circuits are of a type and character long used in the art for EDC verification and packet header processing. In one embodiment, validation circuits 743 are arranged to first receive the transmitted packet and to then pass their outputs to corresponding header checker circuits 748, according to the sequence of steps shown in the alternative in FIGS. 3, 5, or 6. Although a particular arrangement of circuits is described, those skilled in the art will realize that arrangements and sequences other than the above can be used. Accordingly, the invention is not limited to any particular sequence of validation circuits 743 and header checker circuits 748.

Finally, the packet (assuming it has successfully passed all necessary verification and validation tests above) is passed to packet processor 750 for further processing according to well-known methods and by equally well-known devices. Packets that are not successfully verified by EDC verifier 740 are dropped.

Other Alternate Embodiments

Figure 5:
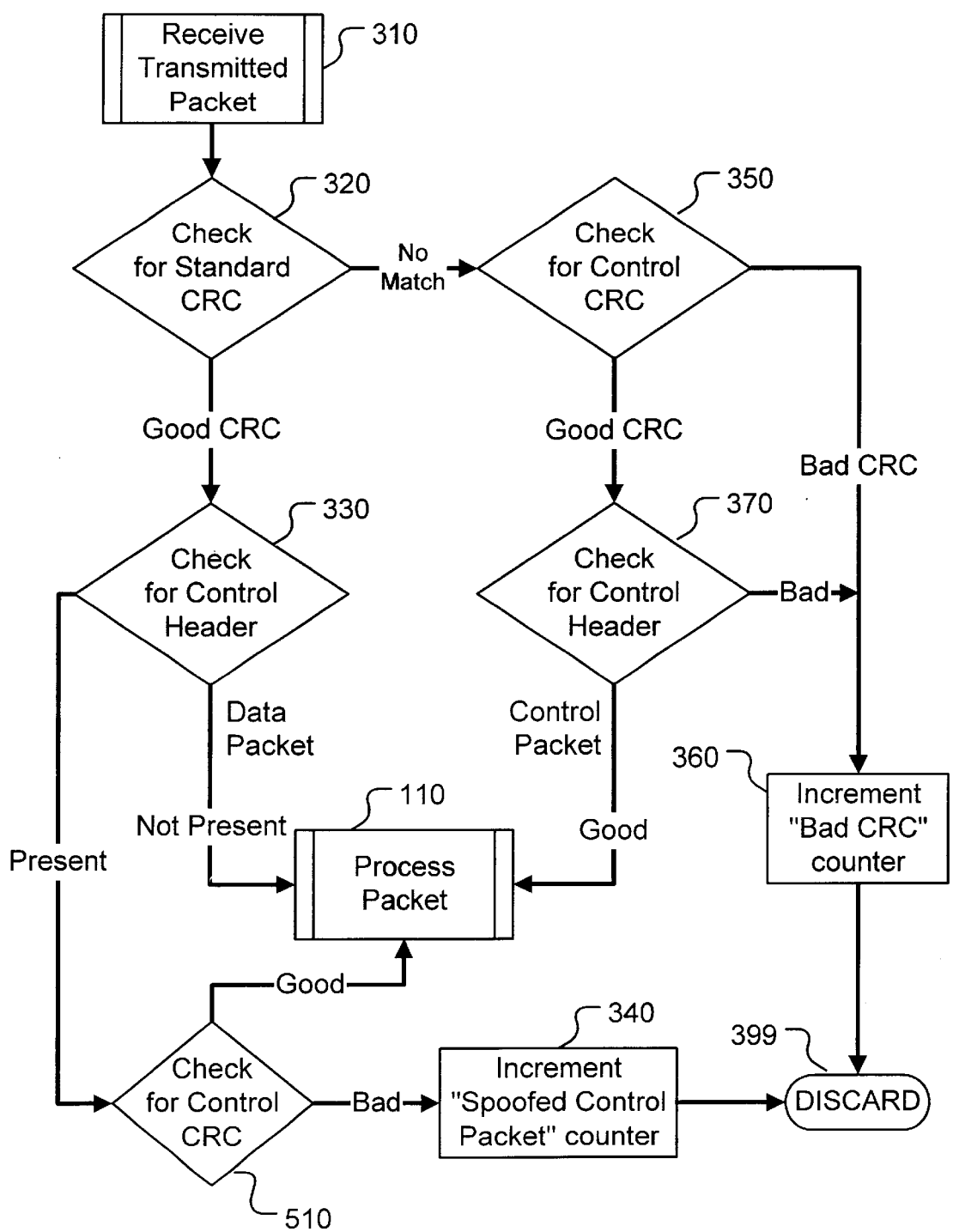
FIG. 5 is a high level flow diagram of the receive process, according to a further alternate embodiment of the present invention.

With regard to the EDC algorithms actually employed, there are two cases one must consider:

Case 1 occurs when the EDC algorithms are chosen in such a way that it is possible for a packet to have an EDC which is both a valid standard EDC and a valid control EDC. This possibility exists if the difference between the two EDCs is that they have different generator polynomials. There is no problem on transmit, but on receive the sequence should be as shown in FIG. 5 rather than as in FIG. 3. The process of FIG. 5 proceeds as in FIG. 3, except that if a Standard CRC is found in step 320 and a control header is found in step 330, the received CRC is checked for the control CRC 510 before it is processed further. This step is necessary to be certain that the packet is valid control packet when the control and standard packet CRCs can be identical. If the control CRC is present, then the packet is a valid control packet and is processed accordingly 110. If, however, the control CRC is not present, the packet is a spoof packet and the Spoofed Control Packet counter is updated 340.

In Case 2, the EDC algorithms are chosen in such a way that no single packet can have an EDC which is both a valid control EDC and also a valid data EDC. Note that the embodiment using an XOR function of the result of the ISO 8802-3 CRC to generate the control EDC falls into this special case.

The order in which steps 320/330 and 350/370 (referring to both FIGS. 3 and 5) are performed is purely illustrative in nature. In fact, steps 320/330 and 350/370 can be performed in any order or in parallel, unless otherwise indicated by the present disclosure.

Figure 6:
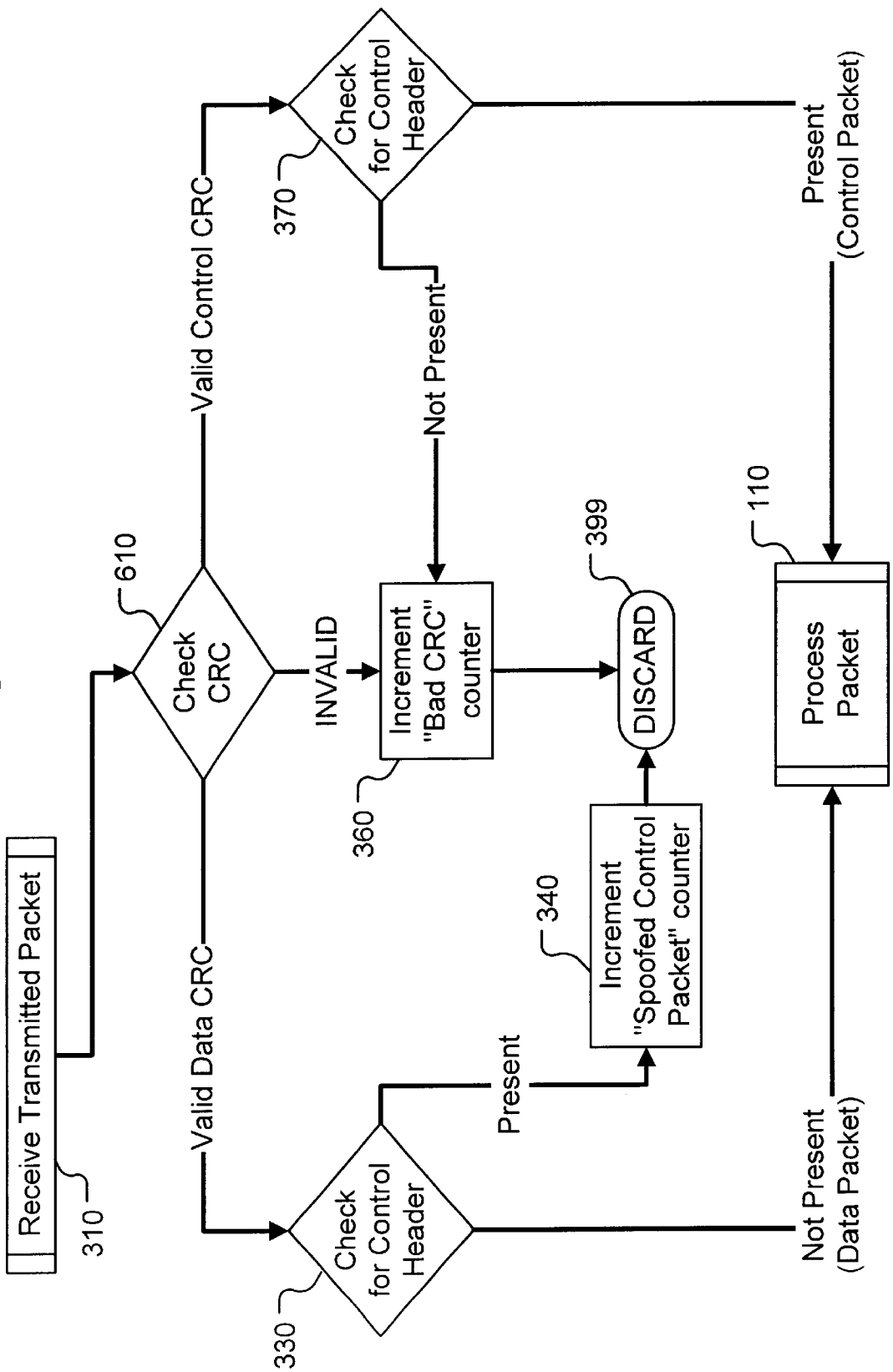
FIG. 6 is a high level flow diagram of the receive process, according to yet another alternate embodiment of the present invention.

In an alternate embodiment of the present invention, the two EDC checks of steps 320 and 350 are not done sequentially, but are done at the same time. The receive logic then becomes as shown in FIG. 6. The received packet CRC is checked 610 to determine if it is a valid data CRC, a valid control CRC, or INVALID (i.e., neither a valid data nor control CRC). In the latter case, the "Bad CRC" counter is incremented 360 and the packet discarded 399 as in other embodiments.

If, however, the received CRC is a valid data CRC, the packet header is checked for conformity with the defined control header 330. If a control header is present, then the received packet is a spoof packet. Accordingly, the "Spoofed Control Packet" counter is incremented 340 and the packet is discarded 399. If the control header is not present, then the packet is a valid data packet and is processed accordingly at step 110.

If the received CRC is a valid control CRC, the header is also checked 370 to see if it is a control header. If it is, then the packet is a control packet and is processed accordingly, 110. If not, then the packet has a bad CRC and is discarded via steps 360 and 399 above.

As before, while the above description refers to use of a CRC EDC, any EDC is useable. Consequently, the present invention in all its embodiments is not limited to any one EDC.

One of ordinary skill in the art can readily appreciate that the above-described embodiments addressing both Case 1 and Case 2 can be readily implemented as either software computer instructions or in hardware. In particular, the following logic table shows the necessary precursor inputs to each possible outcome, regardless of which order the EDC checks are implemented:

Good Data EDC, Bad Control EDC, Data Header→Process (data)

Good Data EDC, Bad Control EDC, Ctrl Header→Spoof/Discard

Good Data EDC, Good Control EDC, Data Header→Process (data)

Good Data EDC, Good Control EDC, Ctrl Header→Process (control)

Bad Data EDC, Bad Control EDC, Data Header→Bad EDC/Discard

Bad Data EDC, Bad Control EDC, Ctrl Header→Bad EDC/Discard

Bad Data EDC, Good Control EDC, Data Header→Bad EDC/Discard

Bad Data EDC, Good Control EDC, Ctrl Header→Process (control)

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may be in the form of computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

In a further alternate embodiment, multiple segregated classes of control traffic are supported by using multiple control EDCs. For example, generating control EDCs using multiple fixed data patterns in the XOR function disclosed above yields multiple control EDCs, each "coded" for a different control scenario. This alternate method is useful in a virtual LAN (VLAN) environment, where a separate EDC can be used for each VLAN. It can also be used in a Virtual Private Network (VPN), where each VPN or each customer uses a distinct EDC.

While particular embodiments of the present invention have been shown and described it will be apparent to those skilled in the art that changes and modifications may be made without departing from this invention in its broader aspect and, therefore, the appended claims are to encompass within their scope all such changes and modification as fall within the true spirit and scope of this invention.

I claim:

1. A method of securing a communications link comprising the steps of:

determining if a packet to be transmitted is a data packet or a control packet;

if said packet is a data packet, computing a first error detection code (EDC) and attaching said first EDC to said packet; but if said packet is a control packet, computing a second EDC and attaching said second EDC to said packet; and checking a received EDC in a received packet against a computed third EDC, said received packet having a header;
   if said checking indicates a valid received EDC, checking said header;
      if said header is not a control header, processing said packet, otherwise discarding said packet; but
   if said checking indicates an invalid received EDC, checking said received EDC against a fourth EDC;
      if said checking against said fourth EDC indicates a valid received EDC, checking said header;
         if said header is a control header, processing said packet, otherwise discarding said packet; but
      if said checking against said fourth EDC indicates an invalid received EDC, discarding said packet.

2. The method of claim 1, wherein said first EDC is a cyclic redundancy check code.

3. The method of claim 2, wherein said cyclic redundancy check code is formed according to ISO/IES standard 8802-3.

4. The method of claim 2, wherein said third EDC is a control cyclic redundancy check code.

5. The method of claim 4, wherein said control cyclic redundancy check code is formed according to ISO/IES standard 8802-3.

6. The method of claim 1, wherein said second EDC is an XOR function of a cyclic redundancy check code.

7. The method of claim 6, wherein said fourth error detection code is an XOR function of a cyclic redundancy check code.

8. The method of claim 1, wherein said fourth EDC is a function of said third error detection code.

9. The method of claim 1, wherein said second EDC comprises a plurality of EDCs and said fourth EDC comprises a matching plurality of EDCs, wherein said checking said received EDC comprises searching for a match between said received EDC and one of said matching plurality of EDCs.

10. A method of securing a communications link comprising the steps of:
   determining if a packet to be transmitted is a data packet or a control packet, and
      if said packet is a data packet, computing a first error detection code (EDC) and attaching said first EDC to said packet; but
      if said packet is a control packet, computing a second EDC and attaching said second EDC to said packet.

11. A method of securing a communications link comprising the steps of:
   checking a received EDC in a received packet against a computed EDC, said received packet having a header, and
      if said checking indicates a valid received EDC, checking said header;
         if said header is not a control header, processing said packet, otherwise discarding said packet; but
      if said checking indicates an invalid received EDC, checking said received EDC against a second EDC;
         if said checking against said second EDC indicates a valid received EDC, checking said header;
            if said header is a control header, processing said packet, otherwise discarding said packet; but
         if said checking against said second EDC indicates an invalid received EDC, discarding said packet.

12. An apparatus for securing a communications link, comprising:
   a classifier circuit, wherein said classifier determines if a packet to be transmitted is a data packet or a control packet;
   an error detection code (EDC) generator connected to said classifier which, if said packet is a data packet, computes a first error detection code (EDC) and attaches said first EDC to said packet, but if said packet is a control packet, computes a second EDC and attaches said second EDC to said packet; and
   an EDC verifier that receives a packet having a header and a received EDC, said EDC verifier comprising:
      a first check module having a first check output, said first check output having a valid and an invalid state, which checks said received EDC against a computed third EDC and if said first check output is valid, checks said header and if said header is not a control header further processes said packet, but if said packet is a control header discards said packet; and
      a second check module having a second check output, said second check output having a valid and an invalid state, which if said first check output is invalid, checks said received EDC against a fourth EDC and if said second check output is valid, checks said header and, if said header is a control header, further processes said packet, otherwise discards said packet; but if said second check output is invalid discards said packet.

13. The apparatus of claim 12, wherein said first EDC is a cyclic redundancy check code.

14. The apparatus of claim 13, wherein said cyclic redundancy check code is formed according to ISO/IES standard 8802-3.

15. The apparatus of claim 13, wherein said third EDC is a cyclic redundancy check code.

16. The apparatus of claim 15, wherein said cyclic redundancy check code is formed according to ISO/IES standard 8802-3.

17. The apparatus of claim 12, wherein said second EDC is an XOR function of a cyclic redundancy check code.

18. The apparatus of claim 17, wherein said fourth EDC is an XOR function of a cyclic redundancy check code.

19. The apparatus of claim 12, wherein said fourth EDC is a function of said third error detection code.

20. The apparatus of claim 12, wherein said second EDC comprises a plurality of EDCs and said fourth EDC comprises a matching plurality of EDCs, wherein said second check module searches for a match between said received EDC and one of said matching plurality of EDCs.

21. An apparatus for securing a communications link, comprising:
   a classifier circuit, wherein said classifier determines if a packet to be transmitted is a data packet or a control packet; and
   an error detection code (EDC) generator connected to said classifier which, if said packet is a data packet, computes a first error detection code (EDC) and attaches said first EDC to said packet, but if said packet is a control packet, computes a second EDC and attaches said second EDC to said packet.

22. An apparatus for securing a communications link, comprising:
   an EDC verifier that receives a packet having a header and a received EDC, said EDC verifier comprising:
      a first check module having a first check output, said first check output having a valid and an invalid state, which checks said received EDC against a computed third EDC and if said first check output is valid, checks said header and if said header is not a control header further processes said packet, but if said packet is a control header discards said packet; and a second check module having a second check output, said second check output having a valid and an invalid state which if said first check output is invalid, checks said received EDC against a fourth EDC and if said second check output is valid, checks said header and, if said header is a control header, further processes said packet, otherwise discards said packet; but if said second check output is invalid discards said packet.

23. A method of securing a communications link comprising the steps of:

determining if a packet to be transmitted is a data packet or a control packet;

computing a transmit error detection code (EDC) using the result of said determining and attaching said transmit EDC to said packet;

checking a received EDC in a received packet against one or more computed EDCs, said received packet having a header and said checking having a validity result;

examining said header using said validity result, said examining having a classification result;

processing or discarding said packet based on said classification result.

24. A method of securing a communications link comprising the steps of:

determining if a packet to be transmitted is a data packet or a control packet;

computing a transmit error detection code (EDC) using the result of said determining and attaching said transmit EDC to said packet.

25. A method of securing a communications link comprising the steps of:

checking a received error detection code (EDC) in a received packet against one or more computed EDCs, said received packet having a header and said checking having a validity result;

examining said header using said validity result, said examining having a classification result;

processing or discarding said packet based on said classification result.

26. A computer system for securing a communications link, comprising computer instructions for:

determining if a packet to be transmitted is a data packet or a control packet;

computing a transmit error detection code (EDC) using the result of said determining and attaching said transmit EDC to said packet;

checking a received EDC in a received packet against one or more computed EDCs, said received packet having a header and said checking having a validity result;

examining said header using said validity result, said examining having a classification result;

processing or discarding said packet based on said classification result.

27. A computer-readable storage medium, comprising computer instructions for:

determining if a packet to be transmitted is a data packet or a control packet;

computing a transmit error detection code (EDC) using the result of said determining and attaching said transmit EDC to said packet;

checking a received EDC in a received packet against one or more computed EDCs, said received packet having a header and said checking having a validity result;

examining said header using said validity result, said examining having a classification result;

processing or discarding said packet based on said classification result.

28. A computer data signal embodied in a carrier wave, comprising computer instructions for:

determining if a packet to be transmitted is a data packet or a control packet;

computing a transmit error detection code (EDC) using the result of said determining and attaching said transmit EDC to said packet;

checking a received EDC in a received packet against one or more computed EDCs, said received packet having a header and said checking having a validity result;

examining said header using said validity result, said examining having a classification result;

processing or discarding said packet based on said classification result.

* * * * *